United States Patent [19]
Yonezawa

[11] Patent Number: 5,959,772
[45] Date of Patent: Sep. 28, 1999

[54] RELAY VARIABLE POWER OPTICAL SYSTEM AND A MICROSCOPE EQUIPPED WITH THE OPTICAL SYSTEM

[75] Inventor: Yasuo Yonezawa, Zushi, Japan

[73] Assignee: Nikon Corporation, Tokyo, Japan

[21] Appl. No.: 09/009,379

[22] Filed: Jan. 20, 1998

Related U.S. Application Data

[63] Continuation-in-part of application No. 08/792,803, Feb. 3, 1997, abandoned.

[30] Foreign Application Priority Data

| Feb. 6, 1996 | [JP] | Japan | 8-044283 |
| Dec. 13, 1996 | [JP] | Japan | 8-353025 |

[51] Int. Cl.$^6$ .......................... G02B 21/06; G02B 23/00
[52] U.S. Cl. .......................................... 359/434; 359/435
[58] Field of Search ............................... 359/362–363, 359/368, 379–381, 421–423, 432–435, 663, 676–677, 689–690

[56] References Cited

U.S. PATENT DOCUMENTS

| 2,313,460 | 3/1943 | Warmisham | 359/368 |
| 3,549,230 | 12/1970 | Kato et al. | 359/434 |
| 4,341,435 | 7/1982 | Lang et al. | 359/385 |
| 4,353,624 | 10/1982 | Yonekubo | 359/434 |
| 4,545,481 | 10/1985 | Yamada | 359/379 |
| 4,685,776 | 8/1987 | Inoue et al. | 359/363 |
| 5,383,058 | 1/1995 | Yonezawa | 359/687 |
| 5,703,716 | 12/1997 | Furuta | 359/434 |
| 5,729,385 | 3/1998 | Nishida et al. | 359/434 |

FOREIGN PATENT DOCUMENTS

| 61-158310 | 7/1986 | Japan | 359/368 |
| 7-35986 | 2/1995 | Japan | 359/368 |

*Primary Examiner*—Thong Nguyen
*Attorney, Agent, or Firm*—Vorys, Sater, Seymour and Pease LLP

[57] ABSTRACT

The present invention provides a relay variable power optical system in a simple structure which is capable of suppressing a change of the position of the exit pupil on varying the power. To this end, the relay variable power optical system is provided with a front lens group G0 for condensing a light from a primary image, a variable power lens system (G1 to G3) for receiving the light from the front lens group G0, and performing zooming and a rear lens group G4 for forming the secondary image by condensing the light from the variable power lens system. When the zooming is performed from the high magnification end to the low magnification end, a distance between the first lens group G1 and the second lens group G2 and a distance between the second lens group G2 and the third lens group G3 are changed. The the second lens group G2 satisfies predetermined magnification conditions with respect to an axial ray from an axial object point of the primary image imaged on the secondary image and a chief ray from a position of an entrance pupil of the relay variable power optical system imaged at a position of the exit pupil.

16 Claims, 12 Drawing Sheets

$\beta'2L>1$ $\beta'2M=1$ $\beta'2H<1$

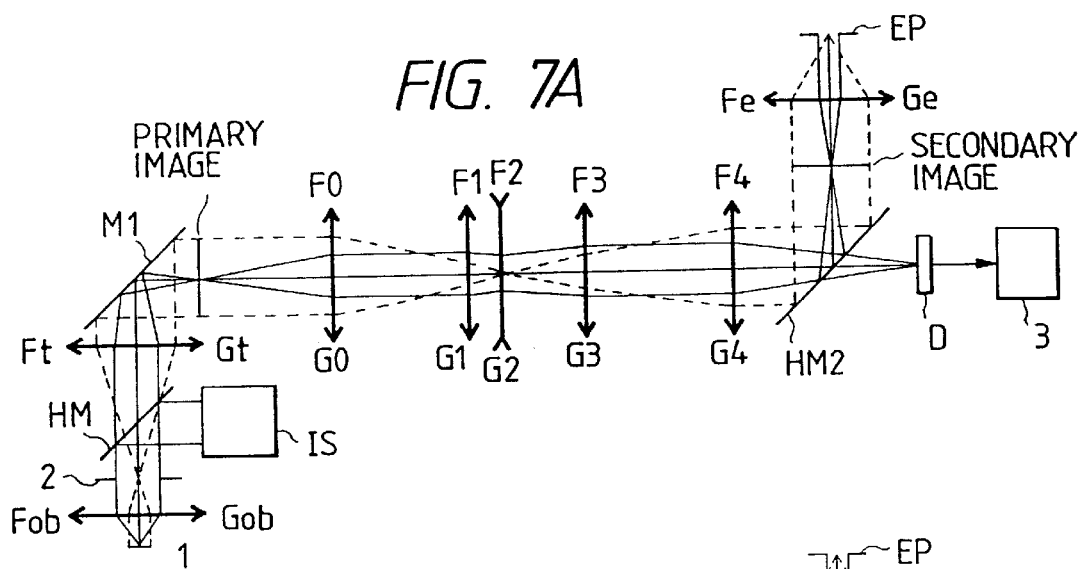
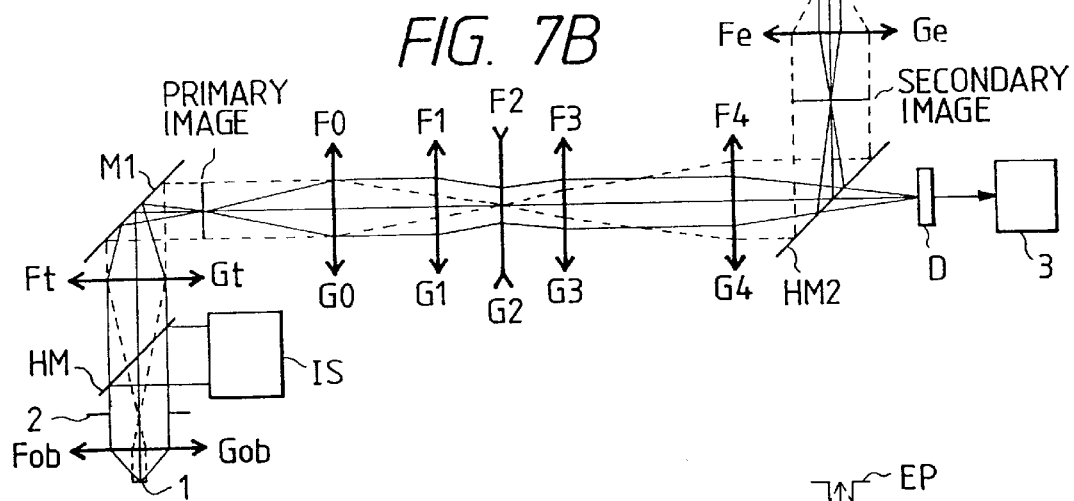
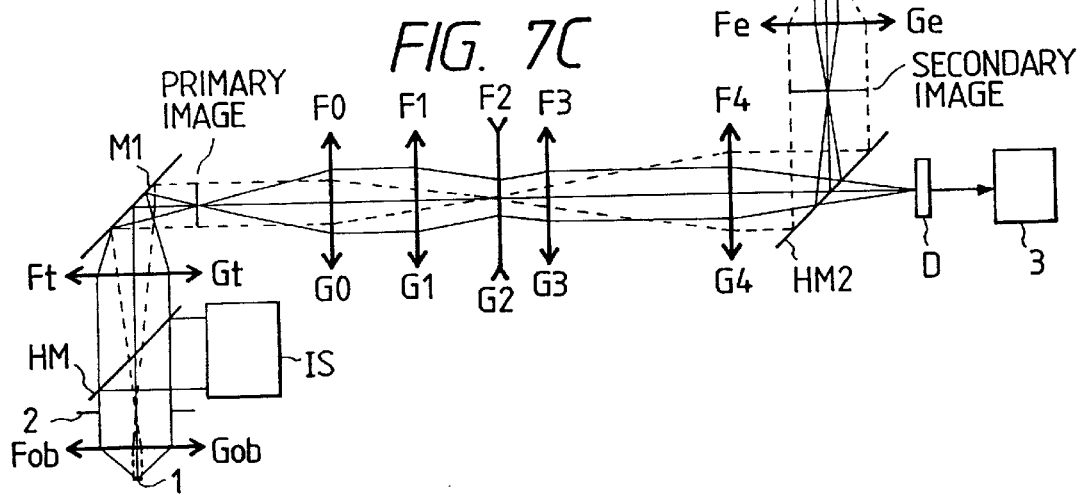

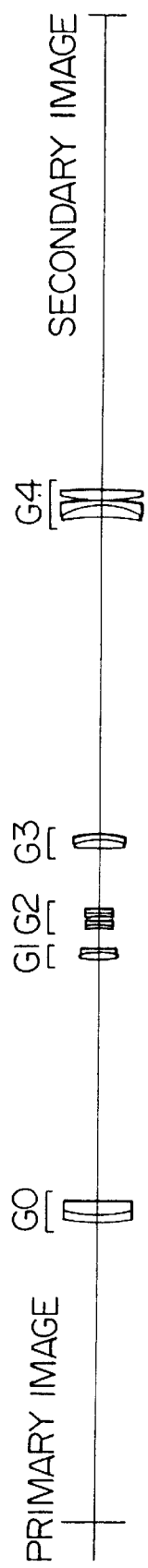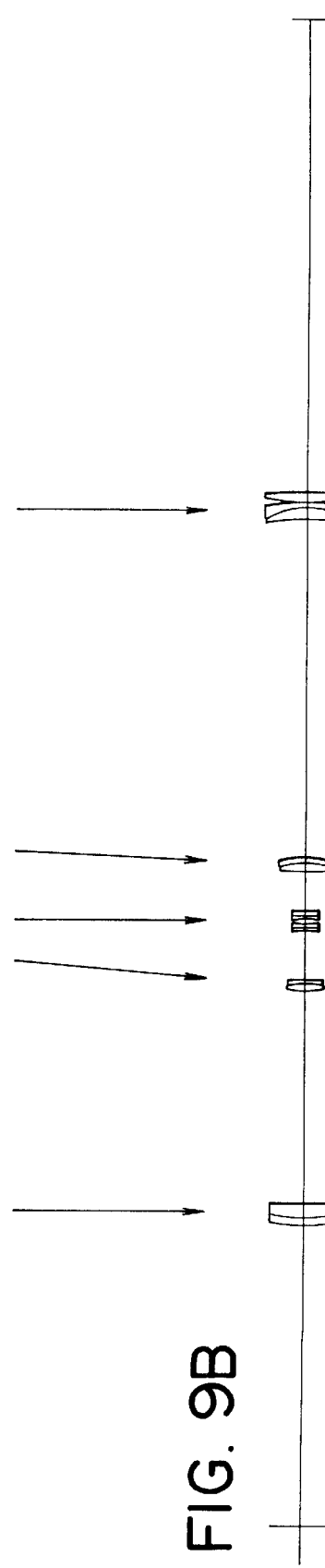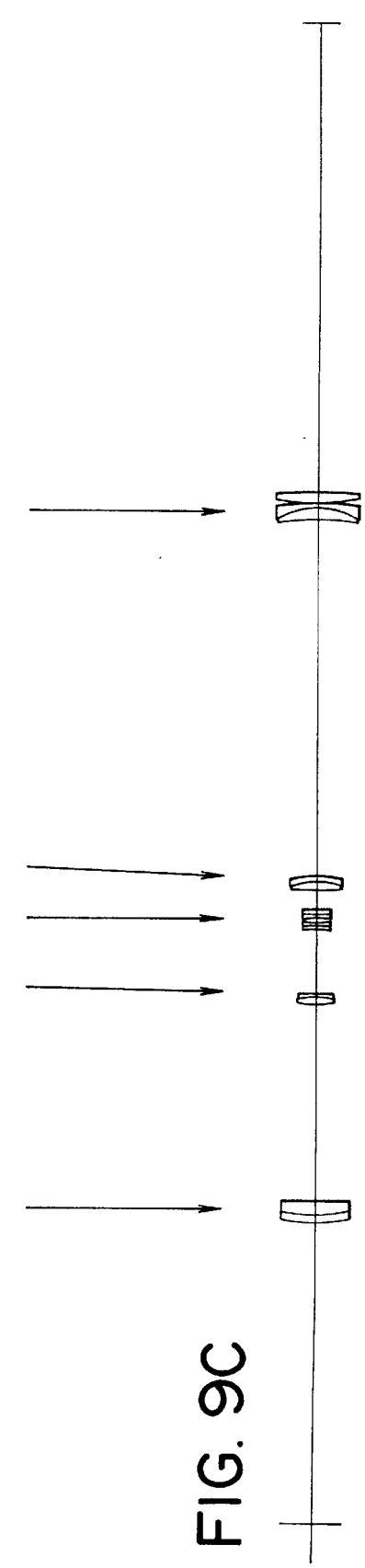

FIG. 10A
FNO=12
SPHERICAL ABERRATION
0.300
FIG. 10B
Y=6.0
ASTIGMATISM
0.300
FIG. 10C
Y=6.0
DISTORTION
0.300(%)
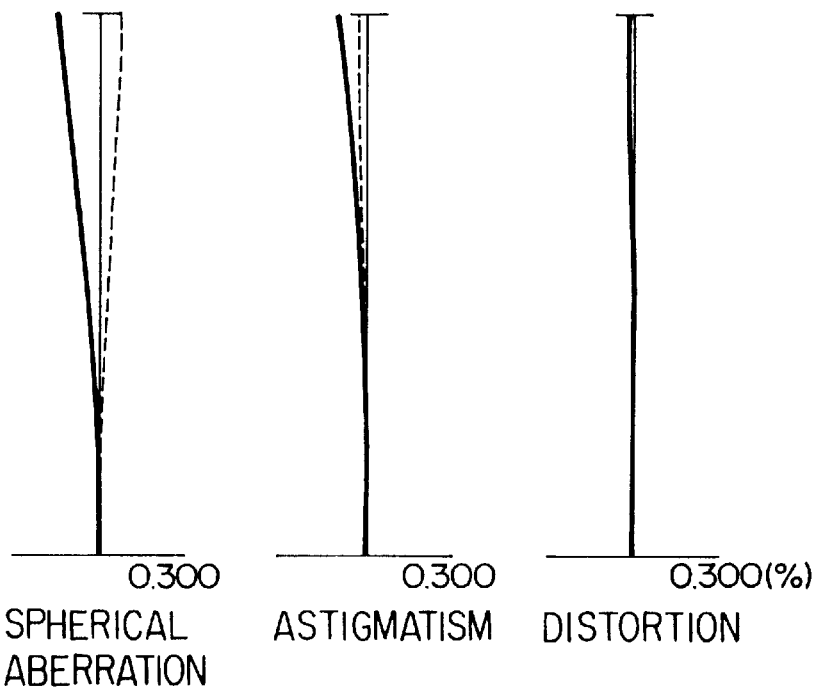
FIG. 10D
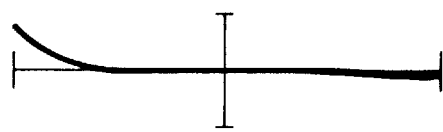
FIG. 10E
FIG. 10F
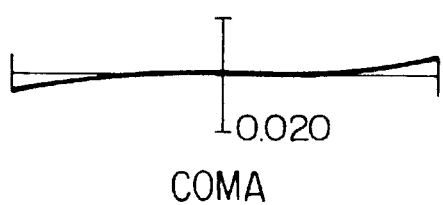
0.020
COMA

FNO=18    Y=6.0    Y=6.0

0.300           0.300           0.300(%)
SPHERICAL     ASTIGMATISM    DISTORTION
ABERRATION 0.020
COMA

FNO=24  Y=6.0  Y=6.0

0.300  0.300  0.300(%)
SPHERICAL  ASTIGMATISM  DISTORTION
ABERRATION 0.020
COMA

RELAY VARIABLE POWER OPTICAL SYSTEM AND A MICROSCOPE EQUIPPED WITH THE OPTICAL SYSTEM

CROSS-REFERENCE TO RELATED APPLICATION

This application is a continuation-in-part of U.S. application Ser. No. 08/792,803 filed Feb. 3, 1997, now abandoned.

BACKGROUND OF THE INVENTION

1. Field of the Invention

The present invention relates to a relay variable power optical system and a microscope equipped with the optical system, and particularly, to a relay variable power optical system for forming a secondary image based on the light from a primary image in the microscope.

2. Related Background Art

As a microscope apparatus or as an inspecting or a measuring apparatus using a microscope, an apparatus is conventionally known in which the light sent from the primary image by an objective lens is re-imaged as a secondary image onto a focal plane of an eyepiece lens, an image plane of a TV camera, or the like, through a relay optical system.

If, for example, a relay system of an optical system such as a microscope is to be adapted as a zoom lens in a simple structure, it becomes difficult to maintain the relationship between an entrance pupil and an exit pupil of the relay optical system to be substantially constant while maintaining the positional relationship between the primary image and the secondary image. More specifically, when a specific lens within the relay optical system is positively moved along the direction of the optical axis in order to change an image magnification while maintaining the positional relationship between the primary image and the secondary image, the position of the exit pupil of the optical system is widely changed with the movement of this lens. For this reason, when the secondary image which is formed by the relay optical system is observed in an enlarged manner by use of an eyepiece lens or the like, the position of an eye point is changed following a change of the image magnification. As a result, a part of the observation light may be vignetted (or eclipsed) to deteriorate an observed image, or the positions of the eyes must be displaced whenever the image magnification is changed, whereby it becomes very troublesome to observe the image.

When two dichroic mirrors or the like are provided between the relay optical system and the secondary image formed by the optical system so as to form three secondary images for respective wavelengths and the images are detected by use of a TV camera of a three-tube type which has three image elements provided at the respective positions of the secondary images, if an inclination or a telecentricity of a chief ray entering into the above-mentioned two dichroic mirrors is changed due to the movement of the exit pupil of the relay optical system, wavelength separation characteristics of the two dichroic mirrors are changed, and colors become unfavorably uneven around the image photoelectrically detected.

SUMMARY OF THE INVENTION

The present invention was conceived taking the problems mentioned above into consideration and an object of the invention is to provide a relay variable power optical system in a simple structure which is capable of suppressing a change of the position of the exit pupil caused by a zooming, and a microscope equipped with the optical system.

In order to achieve the above object, there is provided, according to a first aspect of the present invention, a relay variable power optical system which forms a secondary image based on a light from a primary image, and which comprises: a front lens group which condenses the light from the primary image, a variable power lens system which zooms the secondary image upon receiving the light from the front lens group, and a rear lens group which forms the secondary image by condensing the light from the variable power lens system;

wherein the variable power lens system has a first lens group having a positive refracting power, a second lens group having a negative refracting power, and a third lens group having a positive refracting power, in the named order from the primary image side;

wherein a distance between the first lens group and the second lens group and a distance between the second lens group and the third lens group are changed when the zooming is performed from the high magnification end to the low magnification end; and further wherein, when an axial ray from an axial object point of the primary image is imaged on the secondary image through the relay variable power optical system, the magnification of the second lens group at the high magnification end with respect to the axial ray is $\beta 2H$ and the magnification of the second lens group at the low magnification end with respect to the axial ray is $\beta 2L$ and, when a chief ray from the position of the entrance pupil of the relay variable power optical system is imaged at the position of the exit pupil of the relay variable power optical system through the relay variable power optical system, the magnification of the second lens group at the high magnification end with respect to the chief ray is $\beta'2H$ and the magnification of the second lens group at the low magnification end with respect to the chief ray is $\beta'2L$, the following conditions are satisfied:

$$-1 < \beta 2L \text{ and } \beta 2H < -1,$$

and $$1 < \beta'2L \text{ and } \beta'2H < 1.$$

According to a preferred embodiment of the first aspect of the present invention, when a zoom ratio of the relay variable power optical system is Z, the following conditions are satisfied:

$$-1.25 < \beta 2L \cdot Z^{1/2} < -0.8,$$

and $$0.8 < \beta'2L \cdot \beta'2H < 1.25.$$

Also, according to a second aspect of the present invention, there is provided a microscope which comprises an objective optical system which condenses a light from an observed object to form a primary image of the observed object, a relay variable power optical system which forms a secondary image based on the light from the primary image formed by the objective optical system, and an observation unit which observes the secondary image, which microscope is characterized in that:

the relay variable power optical system is provided with a front lens group which condenses the light from the primary image, a variable power lens system which zooms the secondary image upon receiving the light from the front lens group, and a rear lens group which forms the secondary image by condensing the light from the variable power lens system;

the variable power lens system is provided with a first lens group having a positive refracting power, a second lens group having a negative refracting power, and a third lens group having a positive refracting power, in the named order from the primary image side;

a distance between the first lens group and the second lens group and a distance between the second lens group and the third lens group are changed when the zooming is performed from the high magnification end to the low magnification end; and wherein, when an axial ray from an axial object point of the primary image is imaged on the secondary image through the relay variable power optical system, the magnification of the second lens group at the high magnification end with respect to the axial ray is $\beta 2H$ and the magnification of the second lens group at the low magnification end with respect to the axial ray is $\beta 2L$ and, when a chief ray from the position of the entrance pupil of the relay variable power optical system is imaged at the position of the exit pupil of the relay variable power optical system through the relay variable power optical system, the magnification of the second lens group at the high magnification end with respect to the chief ray is $\beta'2H$ and the magnification of the second lens group at the low magnification end with respect to the chief ray is $\beta'2L$, the following conditions are satisfied:

$$-1 < \beta 2L \text{ and } \beta 2H < -1,$$

and $$1 < \beta'2L \text{ and } \beta'2H < 1.$$

According to a preferred embodiment of the second aspect of the present invention, the observation unit has an eyepiece optical system for observing the secondary image in an enlarged manner. Or, the observation unit has a photoelectric converting element for image-detecting the secondary image, and an image display system for displaying the secondary image based on an output signal from the photoelectric converting element.

BRIEF DESCRIPTION OF THE DRAWINGS

FIGS. 7A to 7C are drawings for schematically showing the structure of a first modification of the third embodiment of the present invention;

FIGS. 9A through 9C are cross-sectional views which illustrate a fourth embodiment of the relay variable power optical system;

FIG. 9A shows the lens arrangement when the magnification of the relay variable power optical system is −1.0;

FIG. 9B shows the lens arrangement when the magnification of the relay variable power optical system is −1.5;

FIG. 9C shows the lens arrangement when the magnification of the relay variable power optical system is −2.0;

FIGS. 10A through 10F are drawings to show aberrations in the fourth embodiment when the magnification of the variable power optical system is −1.0;

FIG. 10A shows the spherical aberration, FIG. 10B shows the astigmatism, FIG. 10C shows the distortion, FIG. 10D shows the comatic aberration at the image height 100%, FIG. 10E shows the comatic aberration at the image height 67%, and FIG. 10F shows the comatic aberration at the image height 0%;

FIG. 11A shows the spherical aberration, FIG. 11B shows the astigmatism, FIG. 11C shows the distortion, FIG. 11D shows the comatic aberration at the image height 100%, FIG. 11E shows the comatic aberration at the image height 67%, and FIG. 11F shows the comatic aberration at the image height 0%;

FIG. 12A shows the spherical aberration, FIG. 12B shows the astigmatism, FIG. 12C shows the distortion, FIG. 12D shows the comatic aberration at the image height 100%, FIG. 12E shows the comatic aberration at the image height 67%, and FIG. 12F shows the comatic aberration at the image height 0%.

DESCRIPTION OF THE PREFERRED EMBODIMENTS

Figure 1:
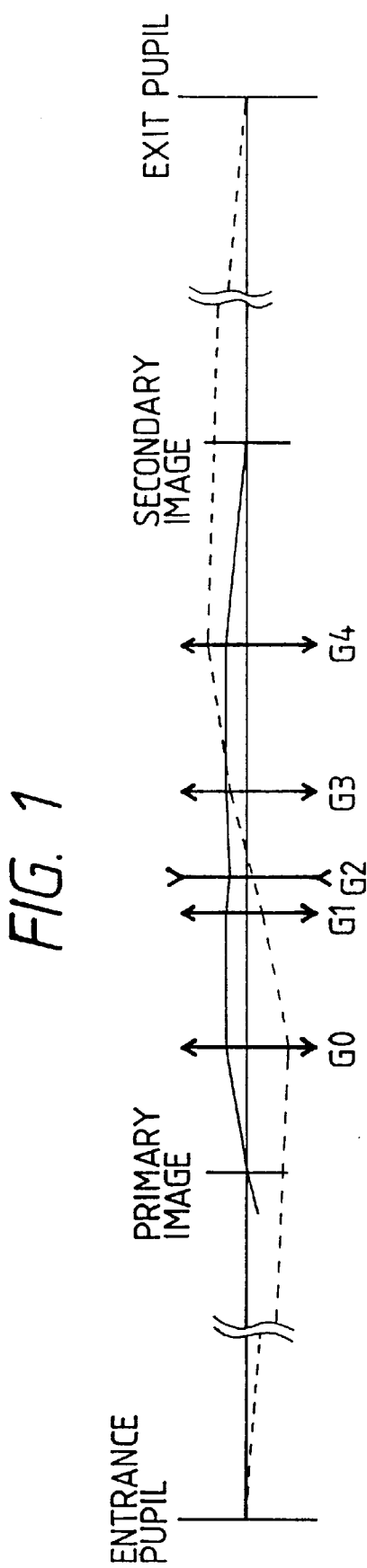
FIG. 1 is a drawing for explaining a basic structure of a relay variable power optical system according to the present invention.

FIG. 1 is a drawing for explaining the basic structure of a relay variable power optical system according to the present invention.

The relay variable power optical system in FIG. 1 is an optical system for forming a secondary image on a focal plane of an eyepiece lens based on a light from a primary image which is formed, for example, by an objective lens of a microscope. This relay variable power optical system is constituted by a collimate lens group G0 having a positive refracting power, a first lens group G1 having a positive refracting power, a second lens group G2 having a negative refracting power, a third lens group G3 having a positive refracting power, and an imaging lens group G4 having a positive refracting power, in the named order from the primary image side.

Here, the collimate lens group G0 constitutes a front lens group for condensing a light from the primary image. Also, the first to third lens groups G1 to G3 constitute a variable power lens system for zooming a secondary image by receiving the light from the front lens group G0, and a distance between the first lens group G1 and the second lens group G2 and a distance between the second lens group G2 and the third lens group G3 are changed when the zooming is performed. Further, the imaging lens group G4 constitutes a rear lens group for forming a secondary image by condensing the light from the variable power lens system G1 to G3.

Note that a ray indicated by a broken line in FIG. 1 shows how a chief ray from the position of an entrance pupil of the relay variable power optical system is imaged at the position of an exit pupil of the relay variable power optical system through the relay variable power optical system. In other words, the ray indicated by the broken line shows a conjugate relation between the pupils of the relay variable power optical system by an imaging relation of the chief ray.

Also, a ray indicated by a solid line in FIG. 1 shows how an axial ray from an axial objective point of the primary image is imaged on the secondary image through the relay variable power optical system. In other words, the ray indicated by the solid line shows a conjugate relation between the images of the relay variable power optical system by an imaging relation of the ray from the axial objective point of the primary image.

Hereinafter, a magnification of the second lens group G2 with respect to an axial ray when the axial ray from the axial objective point of the primary image is imaged on the secondary image through the relay variable power optical system in the present invention is called "the magnification of the second lens group G2 in the image conjugate". Also, the axial ray when the axial ray from the axial objective point of the primary image is imaged on the secondary image through the relay variable power optical system is called "the ray related to the image conjugate".

On the other hand, the magnification of the second lens group G2 with respect to a chief ray when the chief ray from the entrance pupil position of the relay variable power optical system is imaged on the exit pupil position of the relay variable power optical system through the relay variable power optical system is called "the magnification of the second lens group G2 in the pupil conjugate". Also, the chief ray when the chief ray from the entrance pupil position of the relay variable power optical system is imaged on the exit pupil position of the relay variable power optical system through the relay variable power optical system is called "the ray related to the pupil conjugate".

As described above, the variable power lens system of the present invention is a zoom lens which has a first lens group G1 having a positive refracting power, a second lens group G2 having a negative refracting power, and a third lens group G3 having a positive refracting power, in the named order from the primary image side. The zoom lens consisting of three lens groups having positive, negative, and positive refracting powers performs a zooming operation by changing the magnification of the second lens group G2 in the image conjugate. Therefore, a change of the magnification of the second lens group G2 in the image conjugate caused by the zooming is an important factor in designing the relay variable power optical system of the present invention. Also, a change of the magnification of the second lens group G2 in the pupil conjugate has the greatest influence on a change of the conjugate relation between the pupils caused by the zooming.

According to the present invention, the following Conditions (1) and (2) are satisfied:

$$-1 < \beta 2L \text{ and } \beta 2H < -1 \tag{1},$$

and $$1 < \beta'2L \text{ and } \beta'2H < 1 \tag{2},$$

where $\beta 2H$ is the magnification of the second lens group G2 in the image conjugate at the high magnification end; $\beta'2L$ is the magnification of the second lens group G2 in the image conjugate at the low magnification end; $\beta 2H$ is the magnification of the second lens group G2 in the pupil conjugate at the high magnification end; and $\beta'2L$ is the magnification of the second lens group G2 in the pupil conjugate at the low magnification end.

Figure 2A:
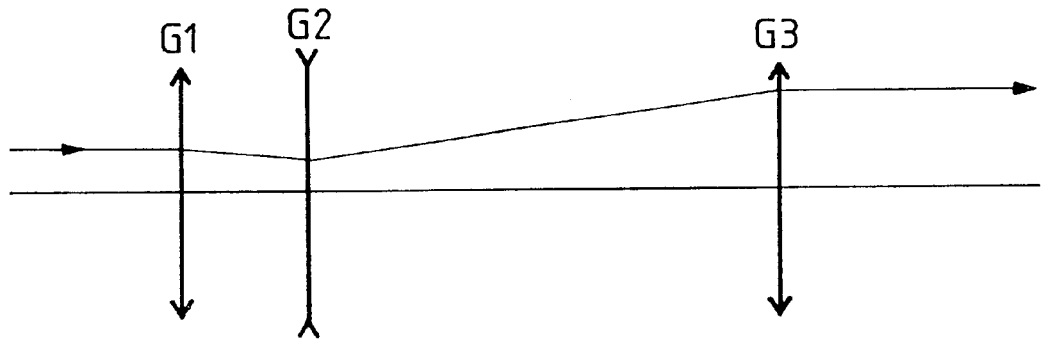
FIGS. 2A to 2C are drawings for showing rays related to the image conjugate at the low magnification end, in a middle magnification state, and at the high magnification end, respectively, in the variable power lens system shown in FIG. 1.
Figure 2B:
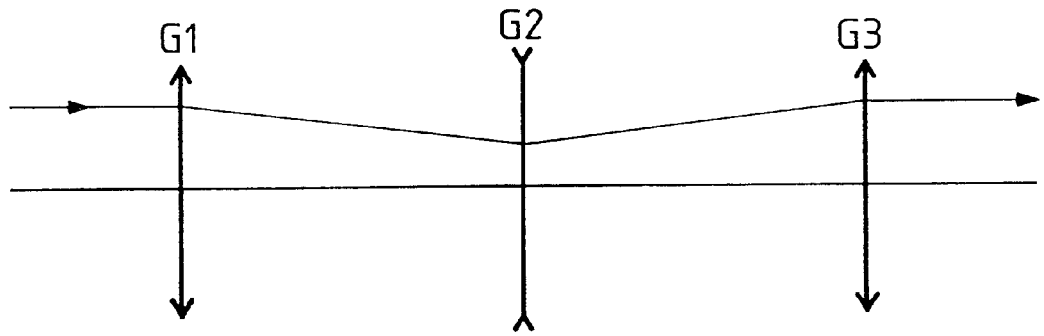
Figure 2C:
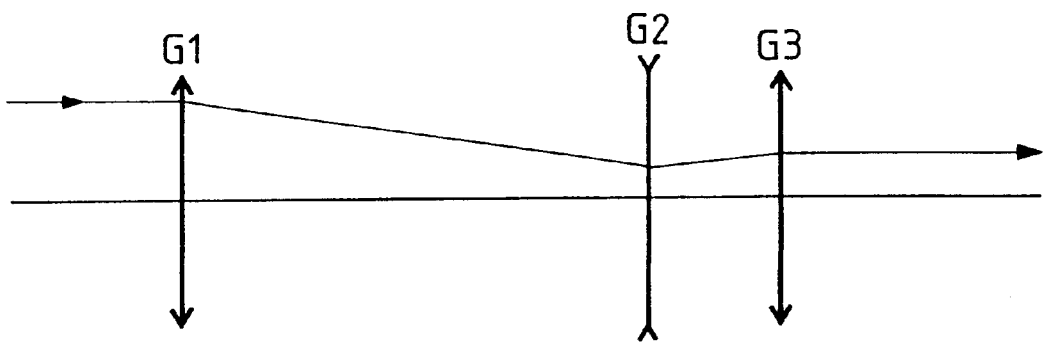

FIGS. 2A to 2C are drawings showing the rays related to the image conjugate at the low magnification end, in a middle magnification state, and at the high magnification end in the variable power lens system of FIG. 1. The magnification $\beta 2L$ of the second lens group G2 in the image conjugate at the low magnification end in FIG. 2A is larger than $-1$, the magnification $\beta 2M$ of the second lens group G2 in the image conjugate in the middle magnification state in FIG. 2B is equal to $-1$, and the magnification $\beta 2H$ of the second lens group G2 in the image conjugate at the high magnification end in FIG. 2C is smaller than $-1$. That is, when the Condition (1) is satisfied, the middle magnification state in which the magnification of the second lens group G2 in the image conjugate is equal to $-1$ inevitably exists.

The Condition (1) stipulates a condition for realizing a small-sized relay variable power optical system capable of zooming (variable power) of a low magnification.

In the Condition (1), when the condition $-1 < \beta 2L$ is not satisfied, the magnification of the relay variable power optical system is shifted to the high magnification side, so that it is difficult to make the magnification lower. On the other hand, when the condition $\beta 2H < -1$ is not satisfied in the Condition (1), it becomes easier to make the magnification lower. However, an amount of movement caused by a variable power of the variable power lens groups (the first lens group G1 and the third lens group G3) becomes large, so that the size of the relay variable power optical system is increased.

Also, according to the present invention, it is desirable to satisfy the following Condition (3), in order to position the zoom arrangement satisfying $\beta 2M = -1$ between the high magnification end and the low magnification end:

$$-1.25 < \beta 2L \cdot Z^{1/2} < -0.8 \tag{3},$$

where Z is a variable power ratio (zoom ratio) of the relay variable power optical system.

Figure 3A:
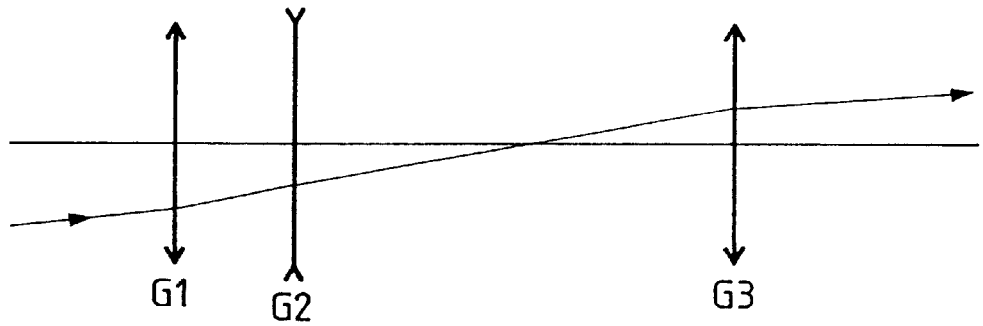
FIGS. 3A to 3C are drawings for showing rays related to the pupil conjugate at the low magnification end, in a middle magnification state, and at the high magnification end, respectively, in the variable power lens system shown in FIG. 1.
Figure 3B:
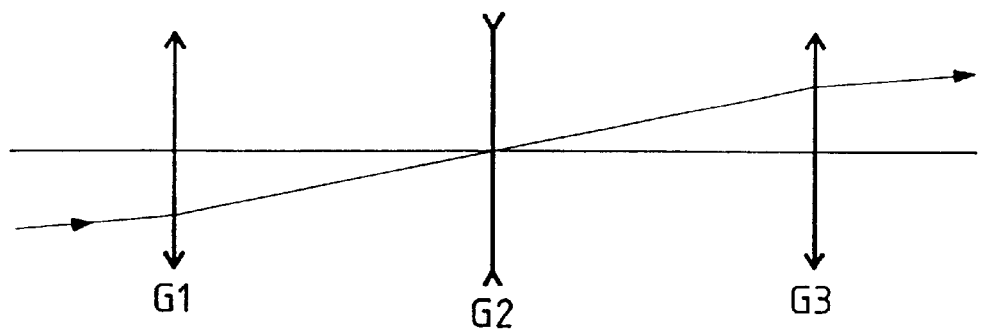
Figure 3C:
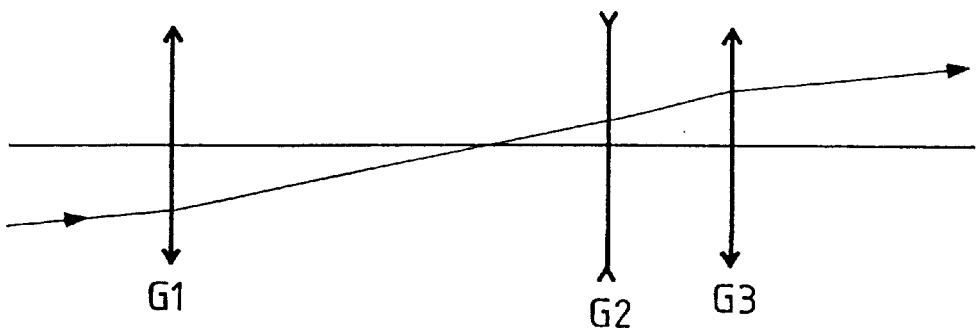

FIGS. 3A to 3C are drawings showing the rays related to the pupil conjugate at the low magnification end, in a middle magnification state, and at the high magnification end in the variable power lens system of FIG. 1. The magnification $\beta'2L$ of the second lens group G2 in the pupil conjugate at the low magnification end in FIG. 3A is larger than 1, the magnification $\beta'2M$ of the second lens group G2 in the pupil conjugate in the middle magnification state in FIG. 3B is equal to 1, and the magnification $\beta'2H$ of the second lens group G2 in the pupil conjugate at the high magnification end in FIG. 3C is smaller than 1. That is, when the Condition (2) is satisfied, the middle magnification state in which the magnification of the second lens group G2 in the pupil conjugate is equal to 1 inevitably exists.

The Condition (2) stipulates a condition for suppressing a change in the conjugate relation between the pupils caused by the zooming. As stated before, it is the second lens group G2 that has the most important effect on the conjugate relation between the pupils. Therefore, if the magnification of the second lens group G2 in the pupil conjugate is set to be around 1 for the entire variable power region, a change in the conjugate relation between the pupils with varying power can be reduced.

When the condition $-1<\beta'2L$ is not satisfied in the Condition (2), the magnification of the second lens group G2 in the pupil conjugate is smaller than 1 for the entire variable power region, so that a change in the conjugate relation between the pupils with varying power becomes large.

On the other hand, when the condition $\beta'2H<1$ is not satisfied in the Condition (2), the magnification of the second lens group G2 in the pupil conjugate is larger than 1 for the entire variable power region, so that a change with varying the conjugate relation between the pupils in power becomes large.

Also, according to the present invention, it is desirable to satisfy the following Condition (4) in order to balance a magnification of the second lens group G2 in the pupil conjugate at the low magnification end and that at the high magnification end:

$$0.8<\beta'2L\cdot\beta'2H<1.25 \quad (4).$$

By satisfy the Condition (4), it is possible to further reduce a change in the conjugate relation between the pupils with varying power by balancing the magnification $\beta'2L$ of the second lens group G2 in the pupil conjugate at the low magnification end and the magnification $\beta'2H$ of the second lens group G2 in the pupil conjugate at the high magnification end.

Embodiments of the present invention will be described below with reference to the attached drawings.

Figure 4A:
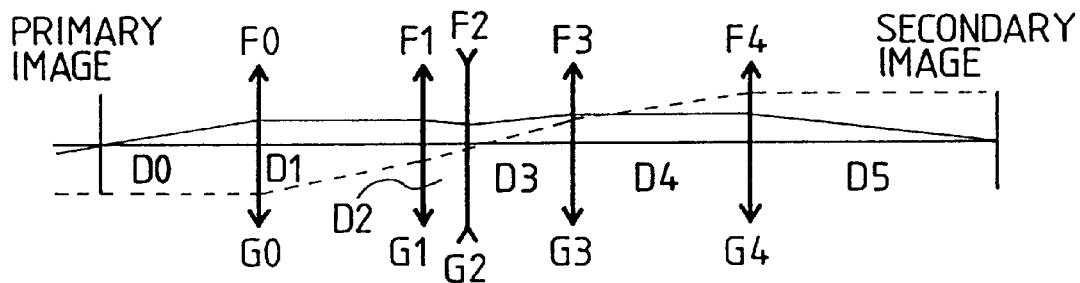
FIGS. 4A to 4C are drawings for schematically showing the structure of a relay variable power optical system according to a first embodiment of the present invention.
Figure 4B:
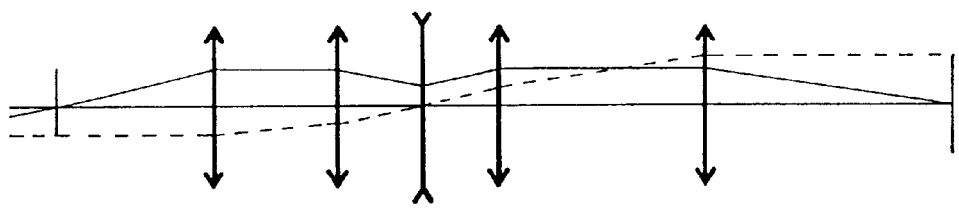
Figure 4C:
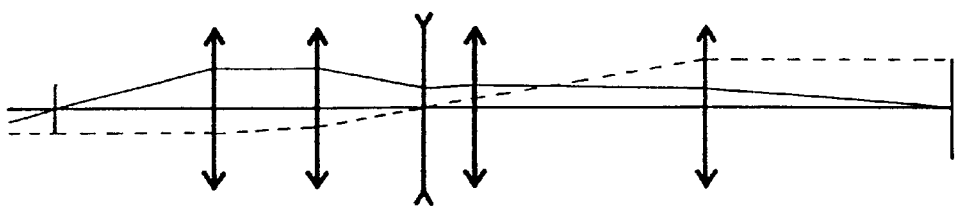

FIGS. 4A to 4C are drawings for schematically showing the structure of a relay variable power optical system according to a first embodiment of the present invention. FIG. 4A shows the low magnification end, FIG. 4B a middle magnification state in which the magnification $\beta 2M$ of the second lens group G2 in the image conjugate becomes $-1$, and FIG. 4C the high magnification end, respectively. The solid lines in FIGS. 4A to 4C respectively indicate the ray related to the image conjugate between the primary image and the secondary image, and the broken lines in FIG. 4A to 4C the ray related to the pupil conjugate between the entrance pupil and the exit pupil, respectively.

The relay variable power optical system in FIGS. 4A to 4C is an optical system for forming the secondary image on a focal plane of an eyepiece lens, an image plane of a TV camera, or the like, based on the light from the primary image formed by an objective lens or the like. The optical system is constituted by a collimate lens group G0 having a positive refracting power, a first lens group G1 having a positive refracting power, a second lens group G2 having a negative refracting power, a third lens group G3 having a positive refracting power, and an imaging lens group G4.

Here, the collimate lens group G0 converts rays from the primary image into collimated rays. The first to third lens groups G1 to G3 constitute an afocal variable power lens system. The first lens group G1 and the third lens group G3 are moved along the optical axis when a zooming is performed. Further, the imaging lens group G4 forms the secondary image based on the collimated rays which are zoomed through the variable power lens system G1 to G3. Note that the relay variable power optical system in FIGS. 4A to 4C is an optical system which is telecentric on the object side, the entrance pupil of which is positioned at infinity.

Specific values for the first embodiment are listed in the following Table (1). In Table (1), F0 to F4 denote the focal lengths of the lens groups G0 to G4, respectively. Also, D0 to D5 respectively denote a distance along the optical axis between the primary image and the position of the principal point of the collimate lens group G0, a distance along the optical axis between the position of the principal point of the collimate lens group G0 and the position of the principal point of the first lens group G1, a distance along the optical axis between the position of the principal point of the first lens group G1 and the position of the principal point of the second lens group G2, a distance along the optical axis between the position of the principal point of the second lens group G2 and the position of the principal point of the third lens group G3, a distance along the optical axis between the position of the principal point of the third lens group G3 and the position of the principal point of the imaging lens group G4, and a distance along the optical axis between the position of the principal point of the imaging lens group G4 and the secondary image. Further, $\beta$ denotes a magnification of the relay variable power optical system, Z a variable power ratio of the relay variable power optical system, ENTP an entrance pupil distance (a distance from the primary image to the entrance pupil along the optical axis), and EXTP an exit pupil distance (a distance from the secondary image to the exit pupil along the optical axis), respectively.

TABLE 1

F0 = 100
F1 = 60
F2 = −20
F3 = 60
F4 = 150
Z = 2

(Low magnification end) $\beta = -1$

| | |
|---|---|
| D0 = 100 | $\beta\ 2L = -0.667$ |
| D1 = 83 | $\beta'2L = 1.21$ |
| D2 = 10 | ENTP = ∞ |
| D3 = 26.67 | EXTP = ∞ |
| D4 = 114 | |
| D5 = 150 | |

(Middle magnification state) $\beta = -1.5$

| | |
|---|---|
| D0 = 100 | $\beta\ 2M = 1$ |
| D1 = 73 | $\beta'2M = 0.945$ |
| D2 = 20 | ENTP = ∞ |
| D3 = 20 | EXTP = 7200 |
| D4 = 120.67 | |
| D5 = 150 | |

(High magnification end) $\beta = -2$

| | |
|---|---|
| D0 = 100 | $\beta\ 2H = -1.33$ |
| D1 = 68 | $\beta'2H = 0.836$ |
| D2 = 25 | ENTP = ∞ |
| D3 = 13.33 | EXTP = ∞ |
| D4 = 127.34 | |
| D5 = 150 | |

(Condition corresponding values)

(3) $\beta\ 2L \cdot Z_{\frac{1}{2}} = -0.943$
(4) $\beta'2L \cdot \beta'2H = 1.012$ Referring to Table (1), the exit pupil distance EXTP is ∞ at the low magnification end, 7200 in the middle magnification state, and ∞ at the high magnification end. That is, in the first embodiment, it is clearly seen that a change of the position of the exit pupil caused by the variable power can be suppressed to be very small with respect to the entrance pupil at infinity. Therefore, if the relay variable power optical system of the first embodiment is applied, for example, to a microscope, it is possible not only to reduce the size of an optical system of the microscope, but also to suppress a fluctuation of the eye point position for observing the secondary image by the eyes through an eyepiece optical system. As a result, it becomes easier to observe the secondary image.

Figure 5A:
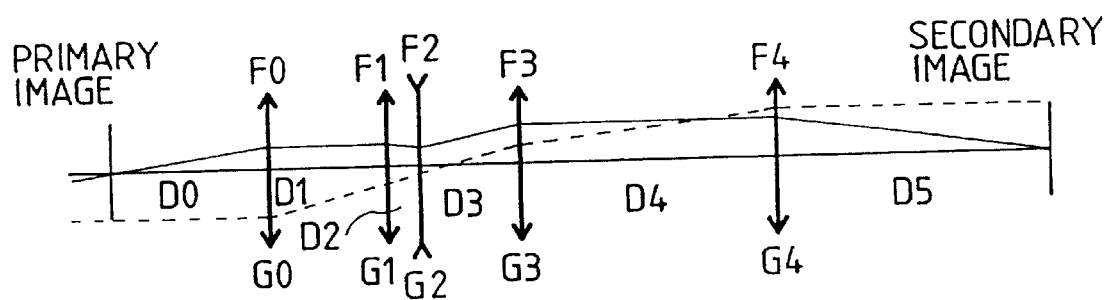
FIGS. 5A to 5C are drawings for schematically showing the structure of a relay variable power optical system according to a second embodiment of the present invention.
Figure 5B:
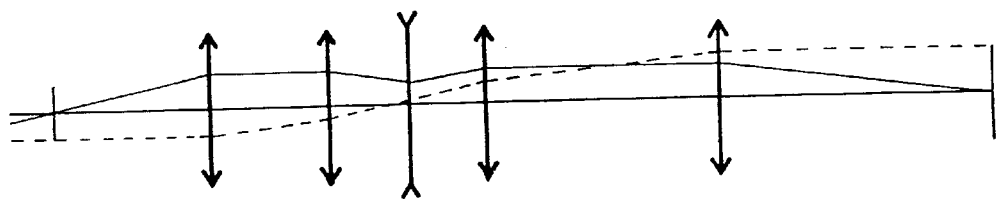
Figure 5C:
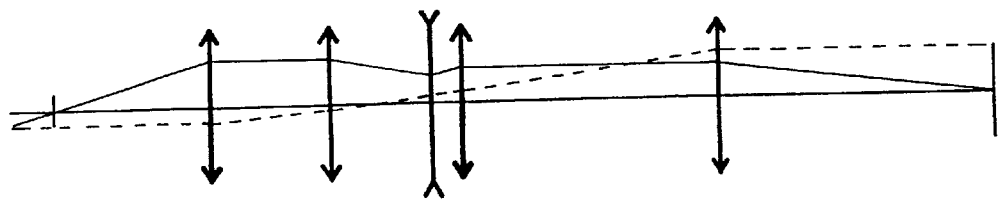

FIGS. 5A to 5C are drawings for schematically showing the structure of a relay variable power optical system according to a second embodiment of the present invention. FIG. 5A shows the low magnification end, FIG. 5B a middle magnification state in which the magnification β2M of the second lens group G2 in the image conjugate is equal to −1, and FIG. 5C the high magnification end, respectively. The solid lines in FIGS. 5A to 5C respectively indicate the ray related to the image conjugate between the primary image and the secondary image, and the broken lines in FIGS. 5A to 5C the ray related to the pupil conjugate between the entrance pupil and the exit pupil, respectively.

The relay variable power optical system in FIGS. 5A to 5C is an optical system for forming the secondary image on a focal plane of an eyepiece lens, an image plane of a TV camera, or the like, based on the light from the primary image formed by an objective lens or the like. The optical system is constituted by a collimate lens group G0 having a positive refracting power, a first lens group G1 having a positive refracting power, a second lens group G2 having a negative refracting power, a third lens group G3 having a positive refracting power, and an imaging lens group G4.

Here, the collimate lens group G0 converts rays from the primary image into collimated rays. The first to third lens groups G1 to G3 constitute an afocal variable power lens system. The second lens group G2 and the third lens group G3 are moved along the optical axis when the zooming is performed. Further, the imaging lens group G4 forms the secondary image based on the collimated rays which are zoomed through the variable power lens system G1 to G3. Note that the relay variable power optical system in FIGS. 5A to 5C is an optical system which is telecentric on the object side, and the entrance pupil of which is positioned at infinity.

Specific values for the second embodiment are listed in the following Table (2). In Table (2), F0 to F4 denote the focal lengths of the lens groups G0 to G4, respectively. Also, D0 to D5 respectively denote a distance along the optical axis between the primary image and the position of the principal point of the collimate lens group G0, a distance along the optical axis between the position of the principal point of the collimate lens group G0 and the position of the principal point of the first lens group G1, a distance along the optical axis between the position of the principal point of the first lens group G1 and the position of the principal point of the second lens group G2, a distance along the optical axis between the position of the principal point of the second lens group G2 and the position of the principal point of the third lens group G3, a distance along the optical axis between the position of the principal point of the third lens group G3 and the position of the principal point of the imaging lens group G4, and a distance along the optical axis between the position of the principal point of the imaging lens group G4 and the secondary image. Further, β denotes a magnification of the relay variable power optical system, Z a variable power ratio of the relay variable power optical system, ENTP an entrance pupil distance (a distance from the primary image to the entrance pupil along the optical axis), and EXTP an exit pupil distance (a distance from the secondary image to the exit pupil along the optical axis), respectively.

TABLE 2

F0 = 100
F1 = 60
F2 = −20
F3 = 60
F4 = 175
Z = 3

(Low magnification end) β −1

| | |
|---|---|
| D0 = 100 | β 2L = −0.571 |
| D1 = 83 | β'2L = 1.74 |
| D2 = 5 | ENTP = ∞ |
| D3 = 28.57 | EXTP = ∞ |
| D4 = 156 | |
| D5 = 175 | |

(Middle magnification state) β = −1.73

| | |
|---|---|
| D0 = 100 | β 2M = −1 |
| D1 = 83 | β'2M = 0.761 |
| D2 = 20 | ENTP = ∞ |
| D3 = 20 | EXTP = 1900 |
| D4 = 149.57 | |
| D5 = 175 | |

(High magnification end) β = −3

| | |
|---|---|
| D0 = 100 | β 2H = −1.71 |
| D1 = 83 | β'2H = 0.576 |
| D2 = 28.33 | ENTP = ∞ |
| D3 = 5.71 | EXTP = ∞ |
| D4 = 155.52 | |
| D5 = 175 | |

(Condition corresponding values)

(3) β 2L · $Z_{½}$ = −0.989
(4) β'2L · β2H = 1.002

Referring to Table (2), the exit pupil distance EXTR is 0 at the low magnification end, 1900 in the middle magnification state, and ∞ at the high magnification end. That is, in the second embodiment, it is clearly seen that a change of the position of the exit pupil caused by the variable power can be suppressed to be very small with respect to the entrance pupil at infinity. Therefore, if the relay variable power optical system of the second embodiment is applied, for example, to a microscope, it is possible not only to reduce the size of an optical system of the microscope, but also to suppress a fluctuation of the eye point position for observing the secondary image by the eyes through the eyepiece optical system. As a result, it becomes easier to observe the secondary image.

Figure 6A:
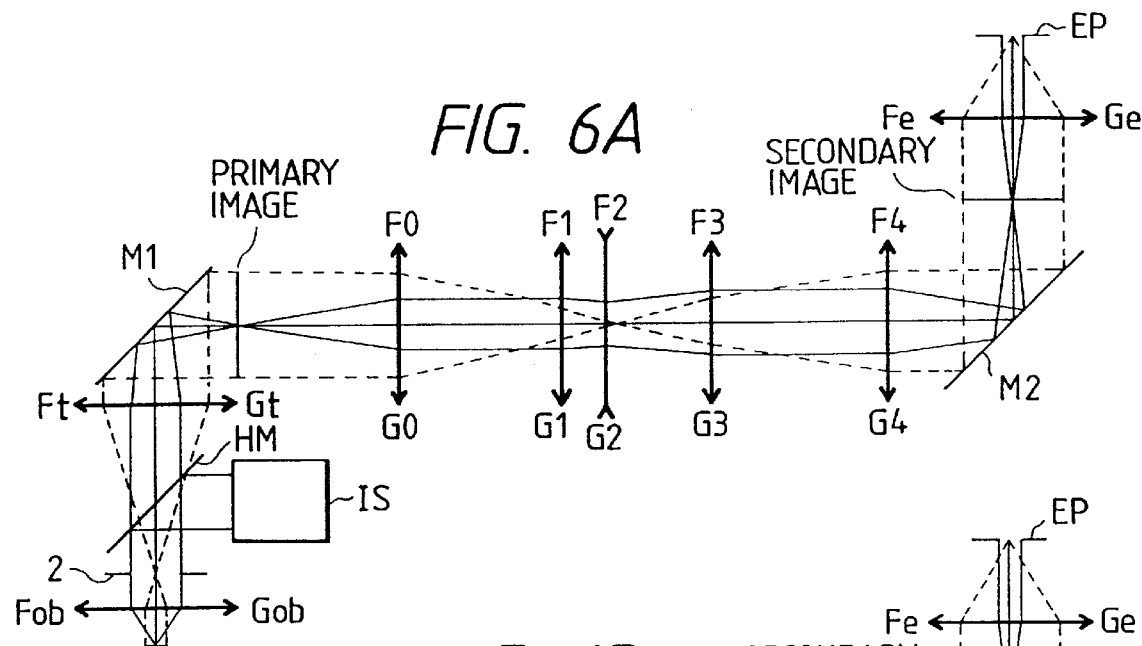
FIGS. 6A to 6C are drawings for schematically showing the structure of a microscope according to a third embodiment of the present invention.
Figure 6B:
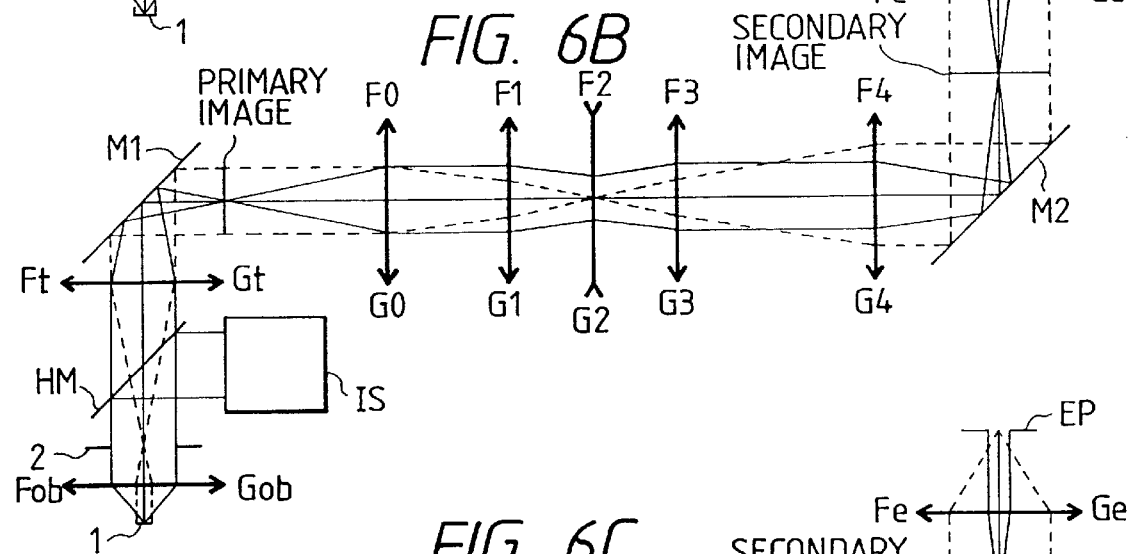
Figure 6C:
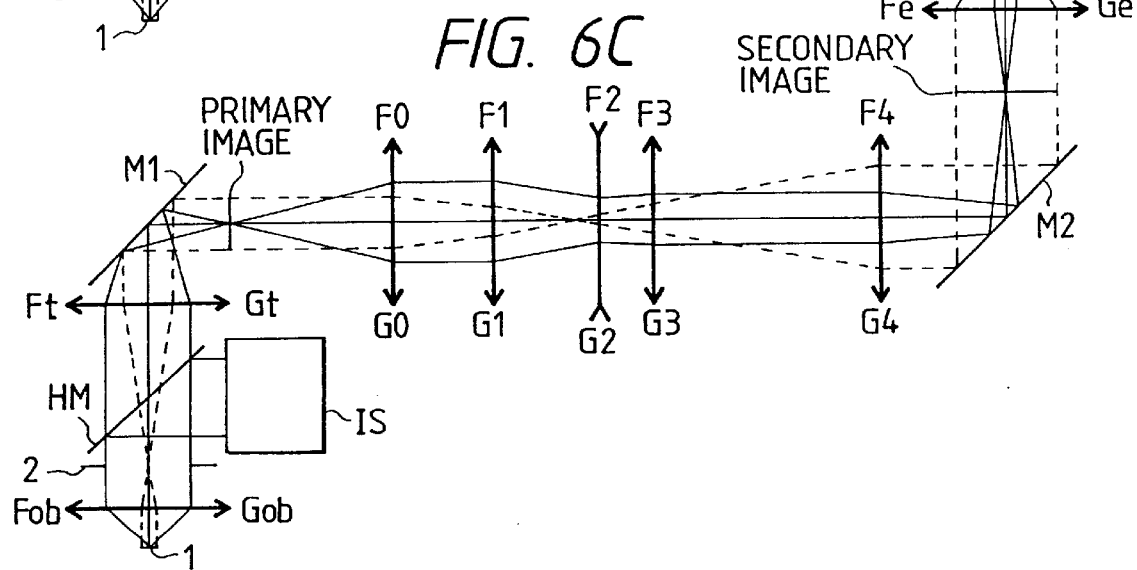

FIGS. 6A to 6C are drawings for schematically showing the structure of a microscope according to a third embodiment of the present invention. The microscope of the third embodiment is a microscope of a type for observing an object by the eyes, which is provided with the relay variable power optical system of the first embodiment.

FIG. 6A shows the low magnification end, FIG. 6B a middle magnification state in which the magnification β2M of the second lens group G2 in the image conjugate is equal to −1, and FIG. 6C the high magnification end, respectively. The solid lines in FIGS. 6A to 6C respectively indicate the ray related to the image conjugate between the primary image and the secondary image, and the broken lines in FIG. 6A to 6C the ray related to the pupil conjugate between the entrance pupil and the exit pupil, respectively.

The microscope in FIGS. 6A to 6C is provided with an illumination system IS for illuminating a sample 1 which is an object to be observed. An illumination light emitted from the illumination system IS is reflected by a half mirror HM and then illuminates the sample 1 through a first objective lens Gob. Light from the sample 1 which is positioned on the focal plane on the object side of the first objective lens Gob (on the sample side) is collimated through the first objective lens Gob, and enters the half mirror HM through an aperture stop 2 which is positioned on the focal plane on the image side of the first objective lens Gob (on the half mirror side). The light passing through the half mirror HM is condensed by a second objective lens Gt and, after being reflected by a mirror M1, forms a primary image of the sample 1.

As stated above, the first objective lens Gob and the second objective lens Gt constitute an objective optical system for condensing light from the sample 1 which is an observed object so as to form a primary image of the object. Then, the position of the aperture stop 2 is the position of the exit pupil of the first objective lens Gob and the position of the entrance pupil of a compound system (Gt, G0 to G4) of the relay variable power optical system and the second objective lens.

The light from the primary image is condensed by the relay variable power optical system (G0 to G4) and, after being reflected by a mirror M2, forms a secondary image of the sample 1. The light from the secondary image is collimated through an eyepiece lens Ge to reach an eye point EP of the observer. Thus, the observer can observe the secondary image of the sample 1 in an enlarged manner through the eyepiece lens Ge.

Specific values for the third embodiment are listed in the following Table (3). In Table (3), Fob, Ft and Fe denote the focal lengths of the first objective lens Gob, the second objective lens Gt and the eyepiece lens Ge, respectively. Also, Do denotes a distance along the optical axis between the sample 1 and the position of the principal point of the first objective lens Gob, Dot a distance along the optical axis between the position of the principal point of the first objective lens Gob and the position of the principal point of the second objective lens Gt, Dt a distance along the optical axis between the position of the principal point of the second objective lens Gt and the primary image, D6 a distance along the optical axis between the secondary image and the position of the principal point of the eyepiece lens Ge, and De a distance along the optical axis between the position of the principal point of the eyepiece lens Ge and the eye point EP, respectively.

Note that F0 to F4 denote the focal lengths of the lens groups G0 to G4, respectively, in the same way as in the first embodiment. Also, D0 to D5 respectively denote a distance along the optical axis between the primary image and the position of the principal point of the collimate lens group G0, a distance along the optical axis between the position of the principal point of the collimate lens group G0 and the position of the principal point of the first lens group G1, a distance along the optical axis between the position of the principal point of the first lens group G1 and the position of the principal point of the second lens group G2, a distance along the optical axis between the position of the principal point of the second lens group G2 and the position of the principal point of the third lens group G3, a distance along the optical axis between the position of the principal point of the third lens group G3 and the position of the principal point of the imaging lens group G4, and a distance along the optical axis between the position of the principal point of the imaging lens group G4 and the secondary image. Further, $\beta$ denotes a magnification of the relay variable power optical system, Z a variable power ratio of the relay variable power optical system, ENTP an entrance pupil distance (a distance from the primary image to the entrance pupil along the optical axis), and EXTP an exit pupil distance (a distance from the secondary image to the exit pupil along the optical axis), respectively.

TABLE 3

Fob = 100
Ft = 10
Fe = 25
Dob = 10
Dot = 110
Dt = 100
D6 = 25
F0 = 100
F1 = 60
F2 = −20
F3 = 60
F4 = 150
Z = 2

(Low magnification end) $\beta$ = −1

| | |
|---|---|
| D0 = 100 | $\beta$ 2L = −0.667 |
| D1 = 83 | $\beta$'2L = 1.21 |
| D2 = 10 | ENTP = ∞ |
| D3 = 26.67 | EXTP = ∞ |
| D4 = 114 | De = 25 |
| D5 = 150 | |

(Middle magnification state) $\beta$ = −1.5

| | |
|---|---|
| D0 = 100 | $\beta$ 2M = −1 |
| D1 = 73 | $\beta$'2M = 0.945 |
| D2 = 20 | ENTP = ∞ |
| D3 = 20 | EXTP = 7200 |
| D4 = 120.67 | De = 24.9 |
| D5 = 150 | |

(High magnification end) $\beta$ = −2

| | |
|---|---|
| D0 = 100 | $\beta$ 2H = −1.33 |
| D1 = 68 | $\beta$'2H = 0.836 |
| D2 = 25 | ENTP = ∞ |
| D3 = 13.33 | EXTP = ∞ |
| D4 = 127.34 | De = 25 |
| D5 = 150 | |

(Condition corresponding values)

(3) $\beta$ 2L · $Z_{1/2}$ = −0.943
(4) $\beta$'2L · $\beta$'2H = 1.012

Referring to Table (3), the distance De from the position of the principal point of the eyepiece lens Ge to the eye point EP is 25 at the low magnification end, 24.9 in the middle magnification state, and 25 at the high magnification end. That is, in the microscope of the third embodiment, a change of the position of the eye point hardly occurs upon varying power. Therefore, it becomes easier to observe the secondary image by the eyes through the eyepiece lens, so as to improve the working efficiency.

FIGS. 7A to 7C are drawings for schematically showing the structure of a first modification of the third embodiment of the present invention.

The first modification has a similar structure to that of the third embodiment, except that an image observation by use of an image display, in addition to the observation by the eyes through an eyepiece lens, is possible in the first modification. That is, in the first modification, the relay variable power optical system of the first embodiment is applied to a microscope which is capable of the observation by the eyes and the image display. In FIGS. 7A to 7C, components having identical functions to those of the components in the third embodiment are given the same reference numerals and symbols as in FIGS. 6A to 6C. The first modification will be described below taking the difference from the third embodiment into consideration.

In the first modification shown in FIGS. 7A to 7C, light passing through the relay variable power optical system (G0 to G4) enters a half mirror HM2. The light which is reflected by the half mirror HM2 forms a secondary image of a sample 1 on the front focal plane of the eyepiece lens Ge. On the other hand, the light passing through the half mirror HM2 forms a secondary image of the sample 1 on a detection plane of a photoelectric converting element such as a detector D. An output from the detector D which detects the secondary image is supplied to an image display unit 3 such as a CRT. Thus, the image display unit 3 displays the secondary image of the sample 1 based on an output signal from the detector D.

In this manner, in the first modification, the observer can observe the secondary image of the sample 1 by the eyes through the eyepiece lens Ge, and can also observe the secondary image of the sample 1 as a displayed image through the image display unit 3.

Figure 8A:
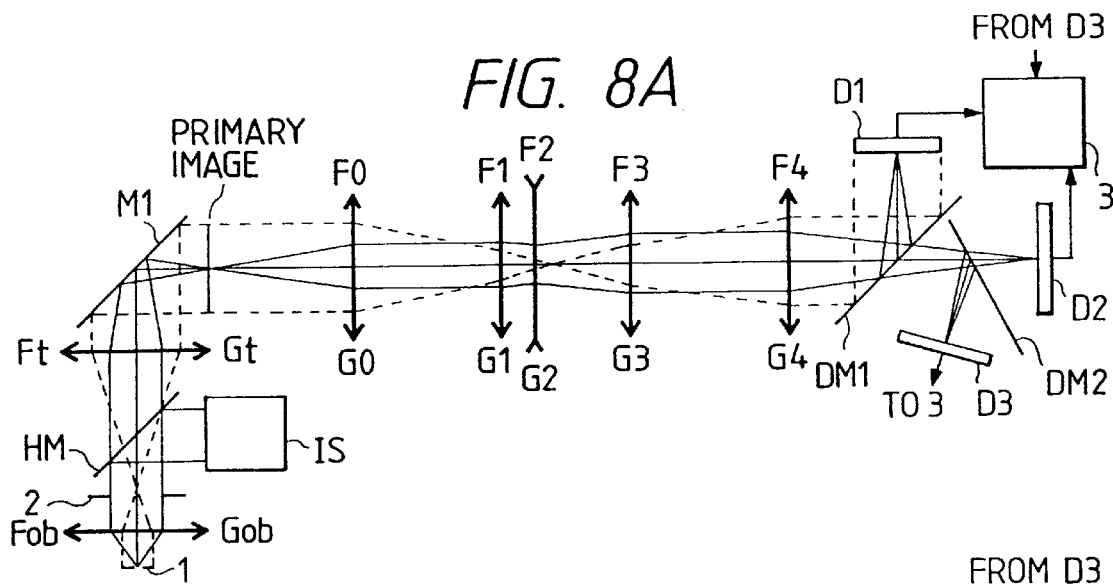
FIGS. 8A to 8C are drawings for schematically showing the structure of a second modification of the third embodiment of the present invention.
Figure 8B:
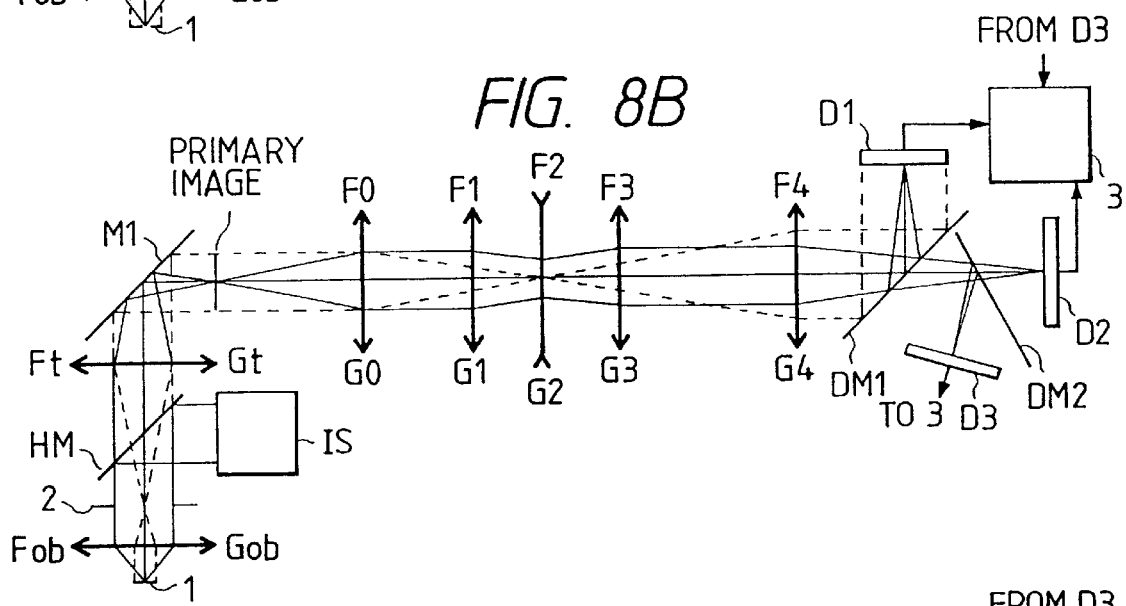
Figure 8C:
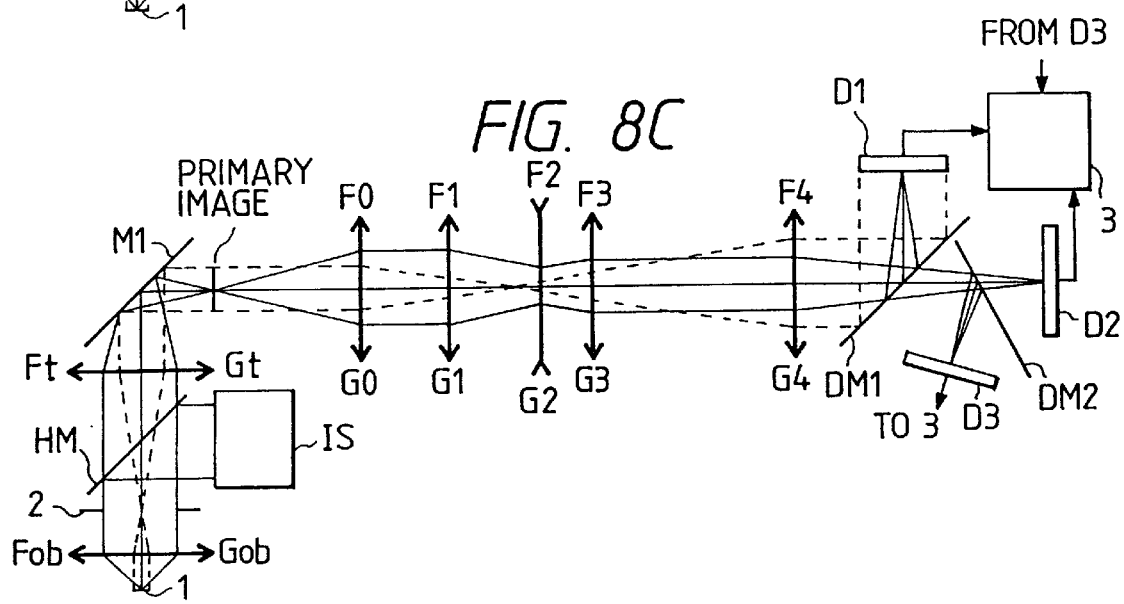

FIGS. 8A to 8C are drawings for schematically showing the structure of a second modification of the third embodiment of the present invention.

The second modification has a similar structure to that of the third embodiment, except that secondary images of three colors are formed by two dichroic mirrors, and these secondary images of three colors are combined and displayed as a color image in the second modification. That is, in the second modification, the relay variable power optical system of the first embodiment is applied to a microscope which is capable of image observation by use of a TV camera of a three tube type. In FIGS. 8A to 8C, components having the identical functions to those of components in the third embodiment are given the same reference numerals and symbols as in FIGS. 6A to 6C. The second modification will be described below taking the difference from the third embodiment into consideration.

In the second modification shown in FIGS. 8A to 8C, light passing through the relay variable power optical system (G0 to G4) enters a first dichroic mirror DM1. The first dichroic mirror DM12 has a characteristic of reflecting, for example, light of color R (red) and passing other light through. Therefore, the light reflected by the first dichroic mirror DM12 forms a secondary image of red color on an image plane of an image element D1.

The light passed through the first dichroic mirror DM12 enters a second dichroic-mirror DM2. The dichroic mirror DM2 has a characteristic of reflecting light having a specific color such as B (blue) and passing another color such as G (green). Therefore, the light reflected by the second dichroic mirror DM2 forms a secondary image of blue color on an image plane of an image element D3. On the other hand, the light passing through the second dichroic mirror DM2 forms a secondary image of green color on an image plane of an image element D2.

The image elements D1 to D3 photoelectrically detect secondary images of three colors, and outputs of three colors therefrom are supplied to the image display unit 3 such as a CRT. Thus, the image display unit 3 displays the secondary image of the sample 1 as a color image on the basis of the output signals from the image elements D1 to D3.

In this manner, in the microscope of the second modification, the secondary image of the sample 1 can be observed as a color image by use of a TV camera of a three tube type. In this case, since the position of the exit pupil of the relay variable power optical system hardly fluctuates at the time of zooming, the inclination or the telecentricity of the chief ray which enters the two dichroic mirrors DM12 and DM2 hardly changes. Therefore, according to the microscope of the second modification, it is possible to obtain an excellent color image without generating uneven colors around the image which is detected photoelectrically.

FIGS. 9A through 9C are drawings schematically showing the structure of the relay variable power optical system according to a fourth embodiment of the present invention.

FIG. 9A shows the lens arrangement at a low magnification end ($\beta=-1.0$), FIG. 9B shows the lens arrangement at a middle magnification state ($\beta=-1.5$) in which the magnification $\beta 2M$ of the second lens group G2 in the image conjugate becomes $-1.0$, and FIG. 9C shows the lens arrangement at a high magnification end ($\beta=-2.0$), respectively.

For example, the relay variable power optical system in FIGS. 9A through 9C is an optical system for forming the secondary image on a focal plane of an eyepiece lens based on light from a primary image formed by an objective lens of a microscope or the like.

The optical system is constituted by a collimate lens group G0 having a positive refracting power, a first lens group G1 having a positive refracting power, a second lens group G2 having a negative refracting power, a third lens group G3 having a positive refracting power, and a fourth lens group G4 having a positive refracting power in the named order from the primary image side.

Here, the collimate lens group G0 converts rays from the primary image into substantially collimated rays. The first to third lens groups G1 to G3 constitute a substantially afocal variable power lens system. The first and third lens groups G1 and G3 are moved along the optical axis, whereby a gap d2 between the first lens group G1 and the second lens group G2, and a gap d3 between the second lens group G2 and the third lens group G3 are changed during the zooming operation.

The imaging lens group G4 forms the secondary image by converging the substantially collimated rays from the variable power lens groups G1 to G3. The relay variable power optical system in FIGS. 9A to 9C is an optical system which is telecentric on the object side (the primary image side), the entrance pupil of which is positioned at infinity.

Table 4 shows specific values of the fourth embodiment. Under "Total Specific Values," F0 to F4 represent the focal lengths of the lens groups G0 to G4, respectively, d0 represents an air gap along the optical axis between the primary image and the collimate lens G0, d1 represents an air gap along the optical axis between the collimate lens group G0 and first lens group G1, d2 represents an air gap between the first lens group G1 and the second lens group G2, d3 represents an air gap between the second lens group G2 and the third lens group G3, d4 represents an air gap between the third lens group G3 and the imaging lens group G4, and Bf represents an air gap along the optical axis (back focus) between the imaging lens group G4 and the secondary image. Further, $\beta$ represents a magnification of the relay variable power optical system, F NO represents an F number of the relay variable power optical system, Z represents a zoom ratio of the relay variable power optical system, ENTP represents a distance of the entrance pupil (an air gap along the optical axis from the primary image to the entrance pupil), EXTP represents a distance of the exit pupil (an air gap along the optical axis from the secondary image to the exit pupil).

Under "Lens Specific Values," the first column includes lens surface numbers, r in the second column represents a radius of curvature of lens surface, d in the third column represents a lens surface separation wherein d1 to d4 are changed during the zooming operation, n in the fourth column represents a refractive index for the d-line ($\lambda=587.6$ nm), a blank in the fourth column represents air (i.e. n=1.00000), and ν in the fifth column represents an Abbe's number. Table 4 also includes values relating to magnification of the second lens group (including values for each of conditions (1) and (2)) and values for each of conditions (3) and (4).

TABLE 4

(Total Specific Values)

d0 = 99.8469
Bf = 153.82
F NO = 12 ~ 18 ~ 24
β = −1 ~ −1.5 ~ −2.0
Z = 2
F0 = 100
F1 = 60
F2 = −20
F3 = 60
F4 = 150

(Lens Specific Values)

|   | r | d | n | υ |   |
|---|---|---|---|---|---|
| 1 | ∞ | (d0) | | | |
| 2 | 54.9409 | 2.50 | 1.62588 | 35.70 | |
| 3 | 49.3103 | 4.50 | 1.49782 | 82.52 | G0 |
| 4 | −410.3620 | (d1) | | | |
| 5 | 29.7051 | 2.50 | 1.49782 | 82.52 | |
| 6 | −32.9087 | 1.20 | 1.74950 | 35.19 | G1 |
| 7 | −98.5774 | (d2) | | | |
| 8 | −30.1513 | 1.50 | 1.86074 | 23.01 | |
| 9 | −23.4016 | 1.00 | 1.52682 | 51.35 | |
| 10 | 27.1479 | 1.50 | | | G2 |
| 11 | −20.6531 | 1.00 | 1.61266 | 44.41 | |
| 12 | 66.2867 | 1.50 | 1.86074 | 23.01 | |
| 13 | −84.9033 | (d3) | | | |
| 14 | 132.9663 | 3.00 | 1.49782 | 82.52 | |
| 15 | −21.7941 | 1.50 | 1.71736 | 29.46 | G3 |
| 16 | −31.2340 | (d4) | | | |
| 17 | −76.3981 | 4.00 | 1.60311 | 60.64 | |
| 18 | −24.1012 | 1.50 | 1.74810 | 52.30 | G4 |
| 19 | −74.4595 | 0.20 | | | |
| 20 | 74.7940 | 3.00 | 1.51680 | 64.10 | |
| 21 | −165.8719 | (Bf) | | | |
| 22 | ∞ | | | | |

(Variable Parameters)

| β | −1.0 | −1.5 | −2.0 |
|---|---|---|---|
| d1 | 78.28 | 68.28 | 63.28 |
| d2 | 7.03 | 17.03 | 22.03 |
| d3 | 20.41 | 13.74 | 7.08 |
| d4 | 104.82 | 111.48 | 118.15 |
| ENTP | ∞ | ∞ | ∞ |
| EXTP | ∞ | 7200 | ∞ |

(Low magnification end) β = −1.0

$\beta 2L = -0.667$
$\beta' 2L = 1.21$
(Middle magnification state) β = −1.5

$\beta 2M = -1$
$\beta' 2M = 0.945$
(High magnification end) β = −2.0

$\beta 2H = -1.33$
$\beta' 2H = 0.836$
(Condition Values)

(3) $\beta 2L \cdot Z^{1/2} = -0.943$
(4) $\beta' 2L \cdot \beta' 2H = 1.012$

FIGS. 10A through 12F show aberrations of the relay variable power optical system having the lens specific values indicated in Table 4.

FIGS. 10A through 10F are drawings showing aberrations in the fourth embodiment when the magnification of the variable power optical system is −1.0. FIG. 10A shows the spherical aberration, FIG. 10B shows the astigmatism, FIG. 10C shows the distortion, FIG. 10D shows the comatic aberration at the image height 100% (Y=6), FIG. 10E shows the comatic aberration at the image height 67% (Y=4), and FIG. 10F shows the comatic aberration at the image height 0%.

Figures 11A, 11B, 11C:
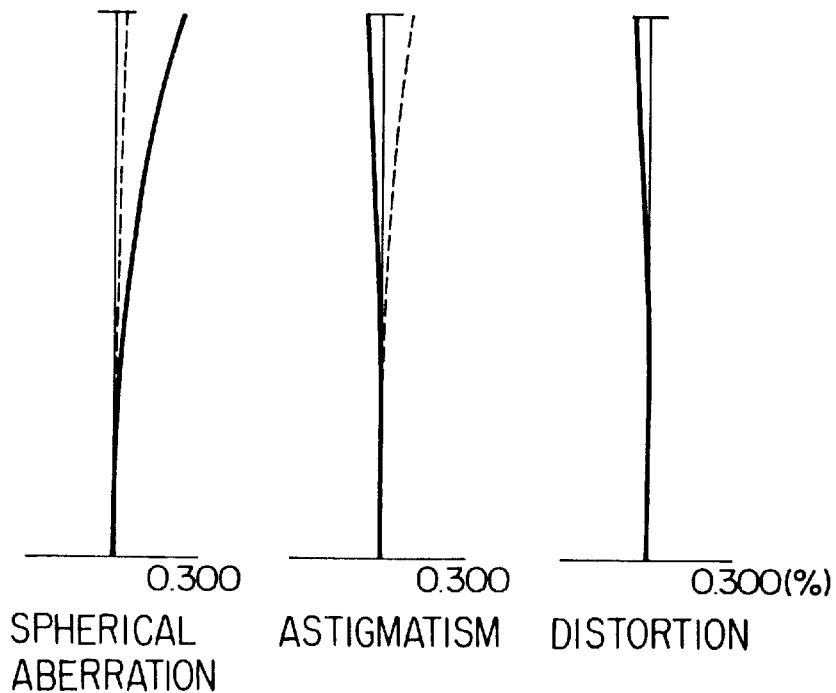
FIGS. 11A through 11F are drawings to show aberrations in the fourth embodiment when the magnification of the variable power optical system is −1.5.
Figure 11D:
Figure 11E:
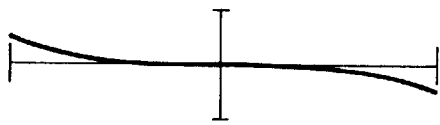
Figure 11F:
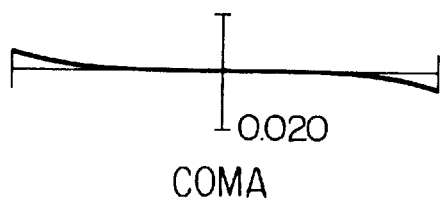

FIGS. 11A through 11F are drawings showing aberrations of the fourth embodiment when the magnification of the variable power optical system is −1.5. FIG. 11A shows the spherical aberration, FIG. 11B shows the astigmatism, FIG. 11C shows the distortion, FIG. 11D shows the comatic aberration at the image height 100% (Y=6), FIG. 11E shows the comatic aberration at the image height 67% (Y=4), and FIG. 11F shows the comatic aberration at the image height 0%.

Figures 12A, 12B, 12C:
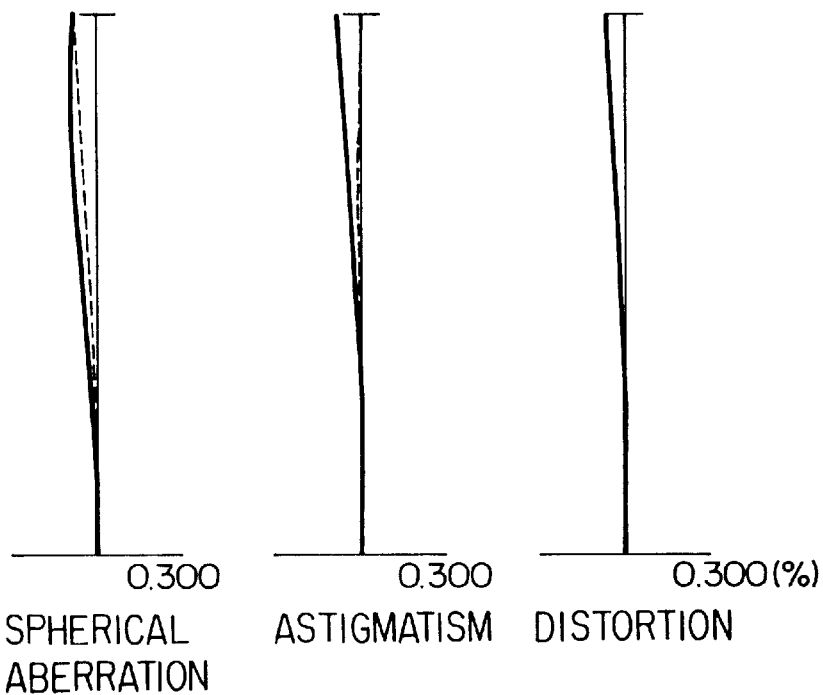
FIGS. 12A through 12F are drawings to show aberrations in the fourth embodiment when the magnification of the variable power optical system is −2.0.
Figure 12D:
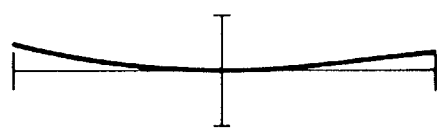
Figure 12E:
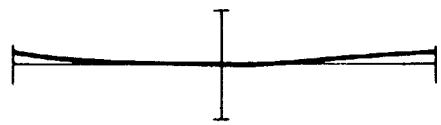
Figure 12F:
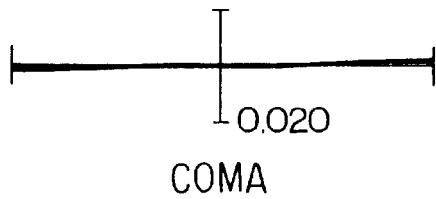

FIGS. 12A through 12F are drawings showing aberrations of the fourth embodiment when the magnification of the variable power optical system is −2.0. FIG. 12A shows the spherical aberration, FIG. 12B shows the astigmatism, FIG. 12C shows the distortion, FIG. 12D shows the comatic aberration at the image height 100% (Y=6), FIG. 12E shows the comatic aberration at the image height 67% (Y=4), and FIG. 12F shows the comatic aberration at the image height 0%.

In each of the aberration diagrams, FNO represents an F number of the relay variable optical system, and Y represents an image height. Further, in the spherical aberration diagrams of FIGS. 10A, 11A, and 12A, the broken line represents the sine condition.

In the astigmatism diagrams of FIGS. 10B, 11B, and 12B, the broken line represents a meridional image surface, and the solid line represents a saggital image surface.

From the above-mentioned drawings of aberrations of FIGS. 10A through 12F, it is clearly seen that the relay variable power optical system of the fourth embodiment of the present invention has an excellent image formation performance.

As described above, according to the present invention, it is possible to comparatively suppress a change in the position of the exit pupil of the relay zooming optical system caused by variable power without deteriorating the positional relationship between the primary image and the secondary image, in spite of the simple structure. Therefore, when the relay variable power optical system of the present invention is applied to a microscope, it is possible to reduce the size of an optical system of the microscope. Further, since a fluctuation of the position of an eye point can be suppressed when a secondary image is observed by the eyes through, for example, an eyepiece optical system, it becomes easier to observe the secondary image and to improve the working efficiency using a microscope or the like. In addition, when a secondary image which is formed by the relay variable power optical system is detected by using a TV camera of a three tube type, or the like, it is possible to obtain an excellent image without generating uneven colors around the photoelectrically-detected image.

What is claimed is:

1. A relay variable power optical system which forms a secondary image based on light from a primary image, comprising:

a front lens group which condenses the light from said primary image, a variable power lens system which receives the light from said front lens group and performs zooming, and a rear lens group which forms said secondary image by condensing the light from said variable power lens system;

said variable power lens system comprising a first lens group having a positive refracting power, a second lens group having a negative refracting power, and a third lens group having a positive refracting power, in the named order from said primary image side;

wherein a distance between said first lens group and said second lens group and a distance between said second lens group and said third lens group are changed when the zooming is performed from a high magnification end to a low magnification end; and wherein, when an axial ray from an axial object point of said primary image is imaged on said secondary image through said relay variable power optical system, the magnification of said second lens group at the high magnification end with respect to said axial ray is $\beta 2H$ and the magnification of said second lens group at the low magnification end with respect to said axial ray is $\beta 2L$ and, when a chief ray from a position of an entrance pupil of said relay variable power optical system is imaged at a position of an exit pupil of said relay variable power optical system through said relay variable power optical system, the magnification of said second lens group at the high magnification end with respect to said chief ray is $\beta'2H$ and the magnification of said second lens group at the low magnification end with respect to said chief ray is $\beta'2L$, the following conditions are satisfied:

$$-1 < \beta 2L \text{ and } \beta 2H < -1,$$

and $$1 < \beta'2L \text{ and } \beta'2H < 1.$$

2. A relay variable power optical system according to claim 1, wherein, when a zoom ratio of said relay variable power optical system is Z, the following conditions are satisfied:

$$-1.25 < \beta 2L \cdot Z^{1/2} < -0.8,$$

and $$0.8 < \beta'2L \cdot \beta'2H < 1.25.$$

3. A relay variable power optical system according to claim 2, wherein a plurality of lens groups from said first, second and third lens groups are moved along an optical axis of said variable power lens system when a zooming operation of said relay variable power optical system is performed.

4. A relay variable power optical system according to claim 1, wherein a plurality of lens groups from said first, second and third lens groups are moved along an optical axis of said variable power lens system when a zooming operation of said relay variable power optical system is performed.

5. A microscope provided with an objective optical system which condenses light from an observation object to form a primary image of said observation object, a relay variable power optical system which forms a secondary image based on the light from said primary image formed by said objective optical system, and an observation unit to observe said secondary image, said microscope being characterized in that:

said relay variable power optical system is provided with a front lens group which condenses the light from said primary image, a variable power lens system which receives the light from said front lens group and performs zooming, and a rear lens group which forms said secondary image by condensing the light from said variable power lens system;

said variable power lens system is provided with a first lens group having a positive refracting power, a second lens group having a negative refracting power, and a third lens group having a positive refracting power, in the named order from said primary image side;

a distance between said first lens group and said second lens group and a distance between said second lens group and said third lens group are changed when the zooming is performed from a high magnification end to a low magnification end; and wherein, when an axial ray from an axial object point of said primary image is imaged on said secondary image through said relay variable power optical system, the magnification of said second lens group at the high magnification end with respect to said axial ray is $\beta 2H$ and the magnification of said second lens group at the low magnification end with respect to said axial ray is $\beta 2L$ and, when a chief ray from a position of an entrance pupil of said relay variable power optical system is imaged at the position of an exit pupil of said relay variable power optical system through said relay variable power optical system, the magnification of said second lens group at the high magnification end with respect to said chief ray is $\beta'2H$ and the magnification of said second lens group at the low magnification end with respect to said chief ray is $\beta'2L$, the following conditions are satisfied:

$$-1 < \beta 2L \text{ and } \beta 2H < -1,$$

and $$1 < \beta'2L \text{ and } \beta'2H < 1.$$

6. A microscope according to claim 5, wherein said observation unit has an eyepiece optical system to observe said secondary image in an enlarged manner.

7. A microscope according to claim 6, wherein, when a zoom ratio of said relay variable power optical system is Z, the following conditions are satisfied:

$$-1.25 < \beta 2L \cdot Z^{1/2} < -0.8,$$

and $$0.8 < \beta'2L \cdot \beta'2H < 1.25.$$

8. A microscope according to claim 7, wherein a plurality of lens groups from said first, second and third lens groups are moved along an optical axis of said variable power lens system when a zooming operation of said relay variable power optical system is performed.

9. A microscope according to claim 6, wherein a plurality of lens groups from said first, second and third lens groups are moved along an optical axis of said variable power lens system when a zooming operation of said relay variable power optical system is performed.

10. A microscope according to claim 5, wherein said observation unit has a photoelectric converting element which detects said secondary image, and an image display system which displays said secondary image based on an output signal from said photoelectric converting element.

11. A microscope according to claim 10, wherein, when a zoom ratio of said relay variable power optical system is Z, the following conditions are satisfied:

$-1.25 < \beta 2L \cdot Z^{1/2} < -0.8,$ and $0.8 < \beta'2L \cdot \beta'2H < 1.25.$ 12. A microscope according to claim 11, wherein a plurality of lens groups from said first, second and third lens groups are moved along an optical axis of said variable power lens system when a zooming operation of said relay variable power optical system is performed.

13. A microscope according to claim 10, wherein a plurality of lens groups from said first, second and third lens groups are moved along an optical axis of said variable power lens system when a zooming operation of said relay variable power optical system is performed.

14. A microscope according to claim 5, wherein, when a zoom ratio of said relay variable power optical system is Z, the following conditions are satisfied:

$-1.25 < \beta 2L \cdot Z^{1/2} < -0.8,$ and $0.8 < \beta'2L \cdot \beta'2H < 1.25.$ 15. A microscope according to claim 14, wherein a plurality of lens groups from said first, second and third lens groups are moved along an optical axis of said variable power lens system when a zooming operation of said relay variable power optical system is performed.

16. A microscope according to claim 5, wherein a plurality of lens groups from said first, second and third lens groups are moved along an optical axis of said variable power lens system when a zooming operation of said relay variable power optical system is performed.

* * * * *